United States Patent
Dong et al.

(10) Patent No.: US 8,872,501 B2
(45) Date of Patent: Oct. 28, 2014

(54) VOLTAGE CONVERTERS WITH REDUCED OUTPUT FREQUENCY VARIATIONS AND ASSOCIATED METHODS

(75) Inventors: Yan Dong, San Jose, CA (US); Peng Xu, San Jose, CA (US); James H. Nguyen, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 559 days.

(21) Appl. No.: 13/051,360

(22) Filed: Mar. 18, 2011

(65) Prior Publication Data

US 2012/0235664 A1  Sep. 20, 2012

(51) Int. Cl.
- *G05F 3/04* (2006.01)
- *H02M 3/156* (2006.01)
- *G05F 1/00* (2006.01)
- *H02M 1/00* (2006.01)

(52) U.S. Cl.
CPC ...... *H02M 3/156* (2013.01); *H02M 2001/0025* (2013.01); *H02M 2001/0022* (2013.01)
USPC ............................ 323/312; 323/311; 323/282

(58) Field of Classification Search
USPC .................................. 323/282–285, 311–317
See application file for complete search history.

(56) References Cited

U.S. PATENT DOCUMENTS

| | | | |
|---|---|---|---|
| 6,646,897 B1 * | 11/2003 | Lomax et al. | 363/97 |
| 6,844,739 B2 * | 1/2005 | Kasai et al. | 324/611 |
| 7,212,415 B2 * | 5/2007 | Osaka | 363/21.02 |
| 7,372,241 B1 * | 5/2008 | Tomiyoshi | 323/288 |
| 7,505,287 B1 * | 3/2009 | Kesterson | 363/21.01 |
| 8,080,987 B1 * | 12/2011 | Qiu et al. | 323/288 |
| 8,154,267 B2 * | 4/2012 | Noda | 323/285 |
| 8,222,882 B2 * | 7/2012 | Balakrishnan et al. | 323/299 |
| 8,446,137 B2 * | 5/2013 | Mariani et al. | 323/285 |
| 2010/0033215 A1 * | 2/2010 | Fogg et al. | 327/137 |

\* cited by examiner

*Primary Examiner* — Adolf Berhane
*Assistant Examiner* — Henry Lee, III
(74) *Attorney, Agent, or Firm* — Perkins Coie LLP (57) ABSTRACT

A switch-mode voltage converter has a switching transistor coupled between an input voltage ($V_{in}$) and the ground and a controller coupled directly between the input voltage ($V_{in}$) and the ground. The controller periodically turns on the switching transistor for a generally constant period of time. The controller is further coupled to a DC bias voltage ($V_{bias}$) and generates a control current based on the input voltage ($V_{in}$) and the DC bias voltage ($V_{bias}$) for generating a switching signal to the switching transistor.

15 Claims, 8 Drawing Sheets

VOLTAGE CONVERTERS WITH REDUCED OUTPUT FREQUENCY VARIATIONS AND ASSOCIATED METHODS

TECHNICAL FIELD

The present disclosure is related generally to voltage converters with reduced output frequency variations and associated methods of control. In particular, the present disclosure is related to direct current ("DC") to DC voltage converters (e.g., buck converters, boost converters, and/or other types of voltage converters) with reduced output frequency variations and associated methods of control.

BACKGROUND

Buck and boost converters are energy-efficient (e.g., up to 95% for integrated circuits) switch-mode power supplies with a variety of applications. For example, buck converters can convert battery voltages (e.g., 12 volts to 24 volts) in a laptop down to a few volts (e.g., 2.5 volts to 5 volts) needed by a central processing unit ("CPU").

Figure 1:
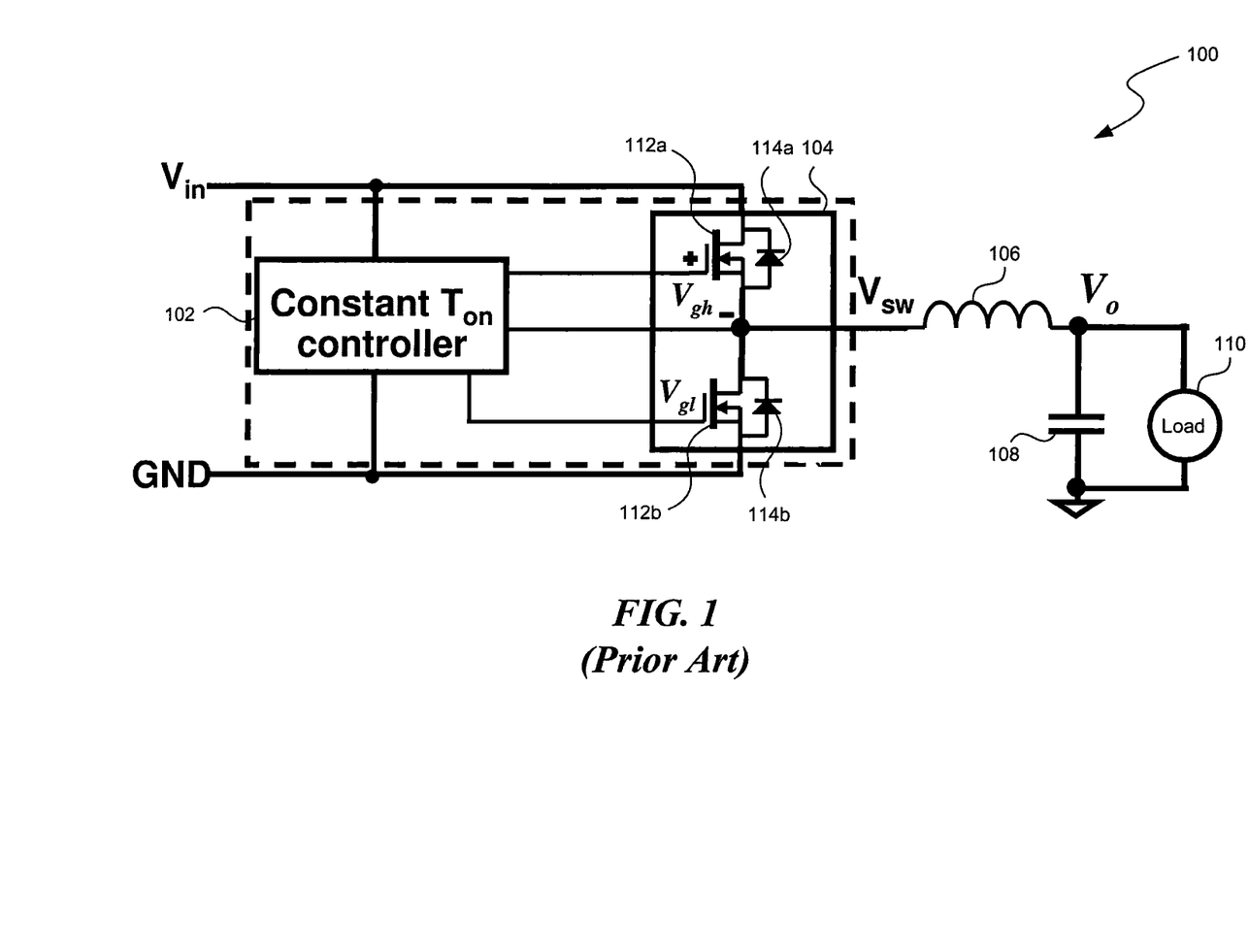
FIG. 1 is a schematic circuit diagram of a buck converter in accordance with the prior art.

FIG. 1 is a schematic circuit diagram of a buck converter 100 in accordance with the prior art. As shown in FIG. 1, the buck converter 100 includes a constant on-time ($T_{on}$) controller 102 and a switching circuit 104 coupled between an input voltage ($V_{in}$) and a reference voltage ($V_{ref}$) (e.g., the ground). The switching circuit 104 includes a first switching transistor 112a (commonly referred to as the high-side switch) and a second switching transistor 112b (commonly referred to as the low-side switch) coupled in series. The first and second switching transistors 112a and 112b individually include a body diode 114a and 114b, respectively. The buck converter 100 also includes an inductor 106, a capacitor 108, and a load 110 (e.g., a CPU) in parallel to the capacitor 108.

In operation, the constant $T_{on}$ controller 102 turns on the first switching transistor 112a for a constant period of time to supply a switching voltage ($V_{sw}$) to charge the inductor 106 and the capacitor 108 during a first period. Subsequently, the constant $T_{on}$ controller 102 turns off the first switching transistor 112a and turns on the second switching transistor 112b to allow current to freewheel around the inductor 106, the capacitor 108, and the second switching transistor 112b. As discussed in more detail below, the present inventors have recognized that the frequency of the output voltage ($V_o$) varies as the input voltage ($V_{in}$) varies when the constant $T_{on}$ controller 102 is coupled directly between the input voltage ($V_{in}$) and the ground. Such frequency variations can adversely affect performance of the load 110. Accordingly, several improvements in at least reducing such frequency variations may be desirable.

DETAILED DESCRIPTION

Various embodiments of voltage converters, circuits, and methods of operation are described below. Many of the details, dimensions, angles, shapes, and other features shown in the figures are merely illustrative of particular embodiments of the technology. A person skilled in the relevant art will also understand that the technology may have additional embodiments, and that the technology may be practiced without several of the details of the embodiments described below with reference to FIGS. 2-7B.

Figure 2:
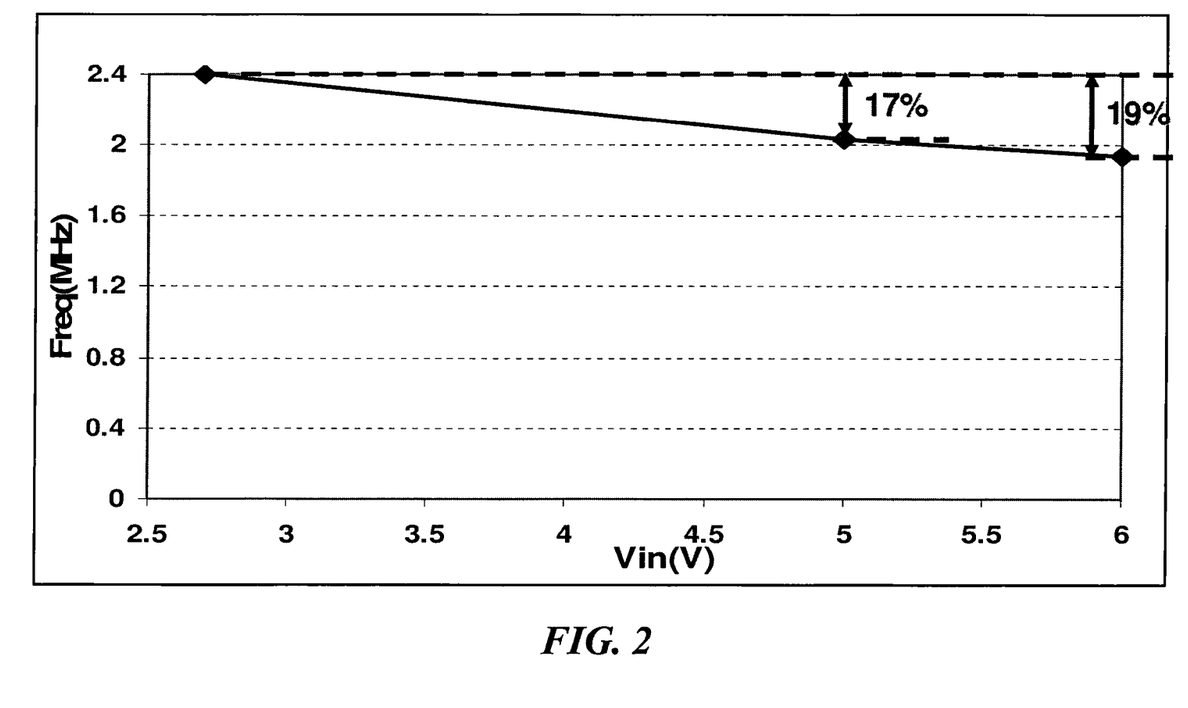
FIG. 2 is a chart of frequency versus input voltage ($V_{in}$) for a conventional buck converter generally similar to that shown in FIG. 1 based on a test conducted in accordance with embodiments of the present technology.

As discussed above, the present inventors have recognized that the frequency of the output voltage ($V_o$) varies as the input voltage ($V_{in}$) varies in conventional switch-mode converters such as that shown in FIG. 1. A test was conducted to determine the relationship between the input voltage ($V_{in}$) and the output voltage ($V_o$) for a buck converter generally similar to that shown in FIG. 1. FIG. 2 is a chart of frequency versus input voltage ($V_{in}$) based on the conducted test. As shown in FIG. 2, when the input voltage ($V_{in}$) was increased from about 2.7 volts to about 5.0 volts, the frequency of the switching voltage ($V_{sw}$) decreased by about 17%. When the input voltage ($V_{in}$) was increased to about 5.8 volts, the frequency of the switching voltage ($V_{sw}$) decreased by about 19%.

Figure 3:
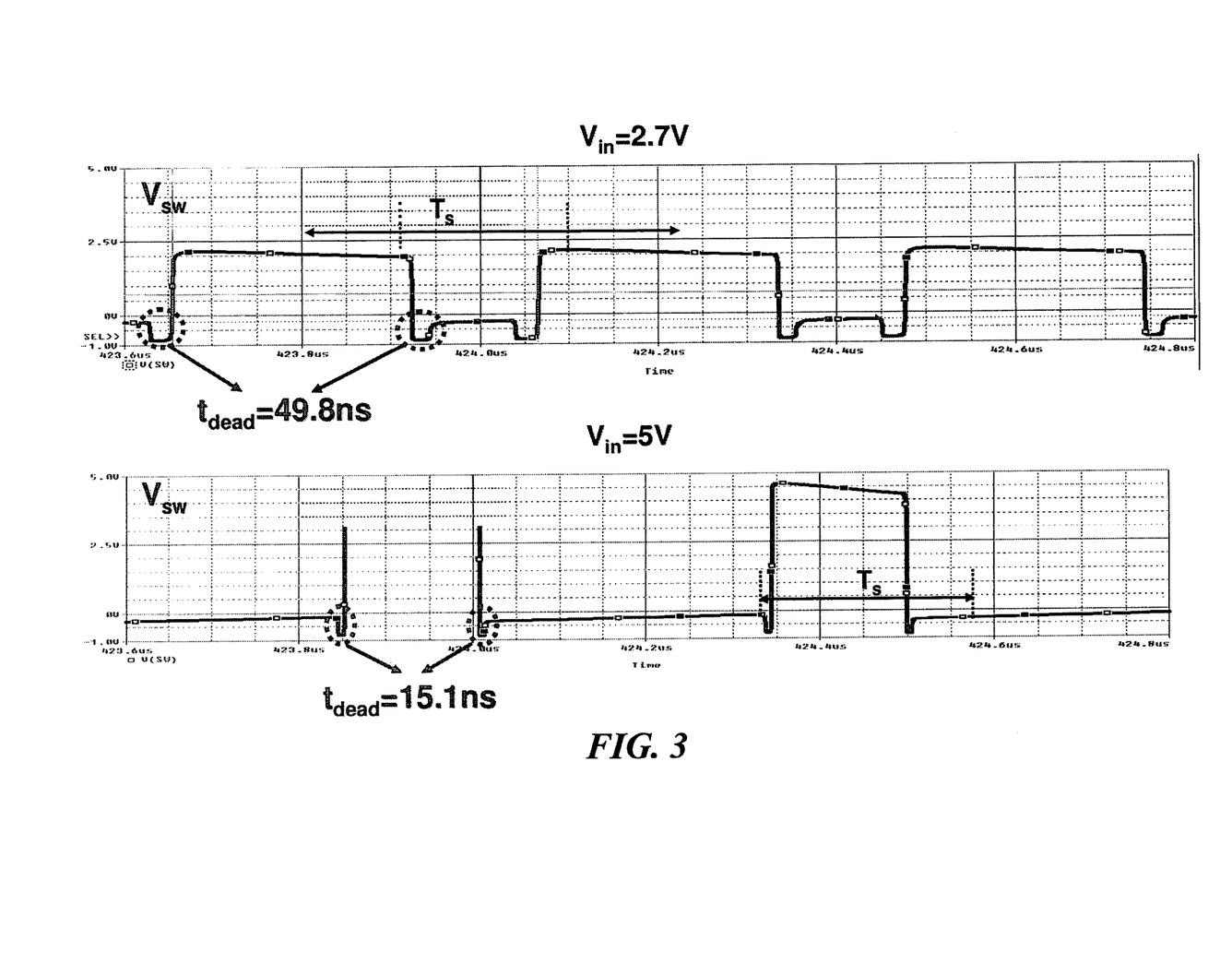
FIG. 3 illustrates charts of switching voltage ($V_{sw}$) versus time for two different input voltage ($V_{in}$) values based on a test conducted in accordance with embodiments of the present technology.

FIG. 3 illustrates charts of switching voltage ($V_{sw}$) versus time for the tested buck converter at a first voltage of about 2.7 volts and at a second voltage of about 5 volts. As shown in FIG. 3, the dead time ($t_{dead}$) is about 49.8 ns when the input voltage ($V_{in}$) is about 2.7 volts, and 15.1 ns when the input voltage ($V_{in}$) is about 5.0 volts. It is believed that the smaller dead time ($t_{dead}$) at higher voltages can cause the frequency of the switching voltage ($V_{sw}$) to decrease (or the cycle period to increase), as discussed in more detail below with reference to FIGS. 4A and 4B.

Figure 4A:
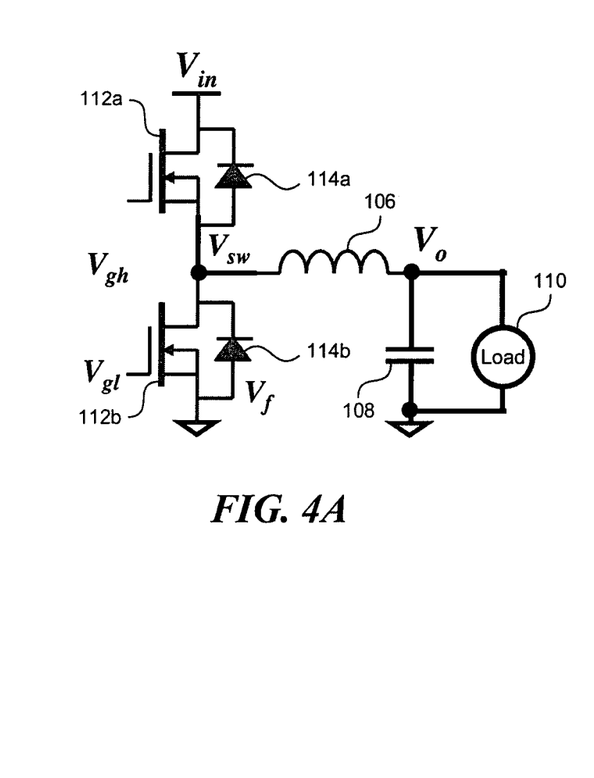
FIG. 4A is a portion of the buck converter shown in FIG. 1.
Figure 4B:
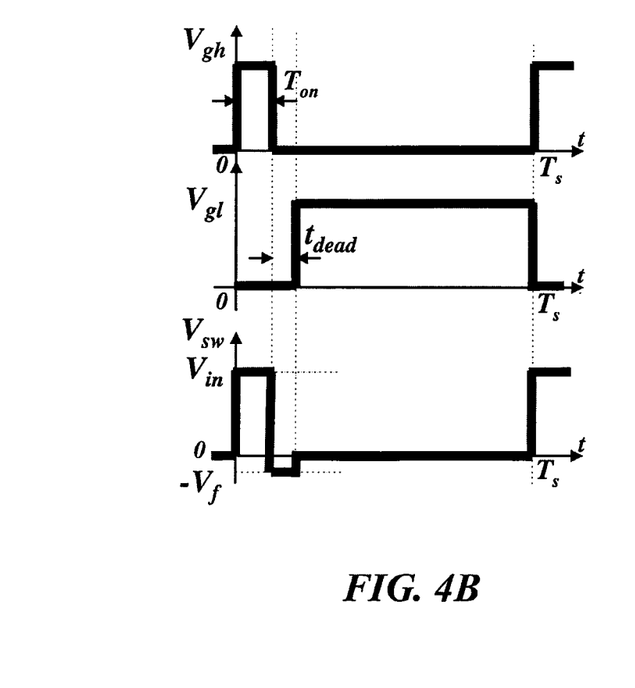
FIG. 4B illustrates voltage versus time charts during operation of the buck converter in FIG. 4A in accordance with embodiments of the present technology.

FIG. 4A is a portion of the buck converter shown in FIG. 1, and FIG. 4B illustrates voltage versus time charts during operation of the buck converter in FIG. 4A in accordance with embodiments of the present technology. Referring to both FIGS. 4A and 4B, for one cycle period ($T_s$), energy balance dictates that the following equation should hold:

$$\int_0^{T_s} (V_{sw} - V_o) dt = 0 \qquad \text{Equation 1}$$

Because the switching frequency ($f_s$) is the inversion of the cycle period ($T_s$), Equation 1 can be rewritten as:

$$f_s = 1/T_s = \frac{V_o}{V_{in} \cdot T_{on} - t_{dead} \cdot V_f} \qquad \text{Equation 2}$$

where $V_f$ is the body diode forward voltage. If the input voltage ($V_{in}$) is high (e.g., at 5 volts in FIG. 3), the dead time ($t_{dead}$) can be substantially smaller than that at low voltages (e.g., at 2.7 volts in FIG. 3). Thus, the dead time ($t_{dead}$) at high voltages may be negligible, and the high input voltage ($V_{in}$) switching frequency ($f_{s\_high\_v_{in}}$) can be approximated as follows:

$$f_{s\_high\_V_{in}} = 1/T_s = \frac{V_o}{V_{in} \cdot T_{on} - t_{dead} \cdot V_f} \approx \frac{V_o}{V_{in} \cdot T_{in}} \qquad \text{Equation 3}$$

On the other hand, if the input voltage ($V_{in}$) is low (e.g., at 2.7 volts in FIG. 3), the dead time ($t_{dead}$) may not be neglected. Thus, the low input voltage ($V_{in}$) switching frequency ($f_{s\_low\_v_{in}}$) can be approximated as follows:

$$f_{s\_low\_V_{in}} = 1/T_s = \frac{V_o}{V_{in} \cdot T_{on} - t_{dead} \cdot V_f} \qquad \text{Equation 4}$$

As shown in Equations 3 and 4, the low input voltage ($V_{in}$) switching frequency) ($f_{s\_low\_v_{in}}$) has a denominator that is smaller than that of the high input voltage ($V_{in}$) switching frequency ($f_{s\_high\_v_{in}}$) when the on time ($T_{on}$) is constant. As a result, the low input voltage ($V_{in}$) switching frequency ($f_{s\_low\_v_{in}}$) is higher than the high input voltage ($V_{in}$) switching frequency ($f_{s\_high\_v_{in}}$) as follows:

$$f_{s\_low\_v\_in} > f_{s\_high\_high\_v_{in}} \qquad \text{Equation 5}$$

The foregoing frequency variations of the output voltage ($V_o$) can adversely affect performance of a load coupled to the switch-mode power supplies. For example, certain loads may include band-pass filters designed for a specific frequency. Thus, variations in supply frequencies may result in malfunction and/or other defects of the designed circuit. The present inventors have discovered improvements to switch-mode power supplies that can at least reduce the foregoing output frequency variations. Certain improvements are discussed below with reference to FIGS. 5A-7B.

Figure 5A:
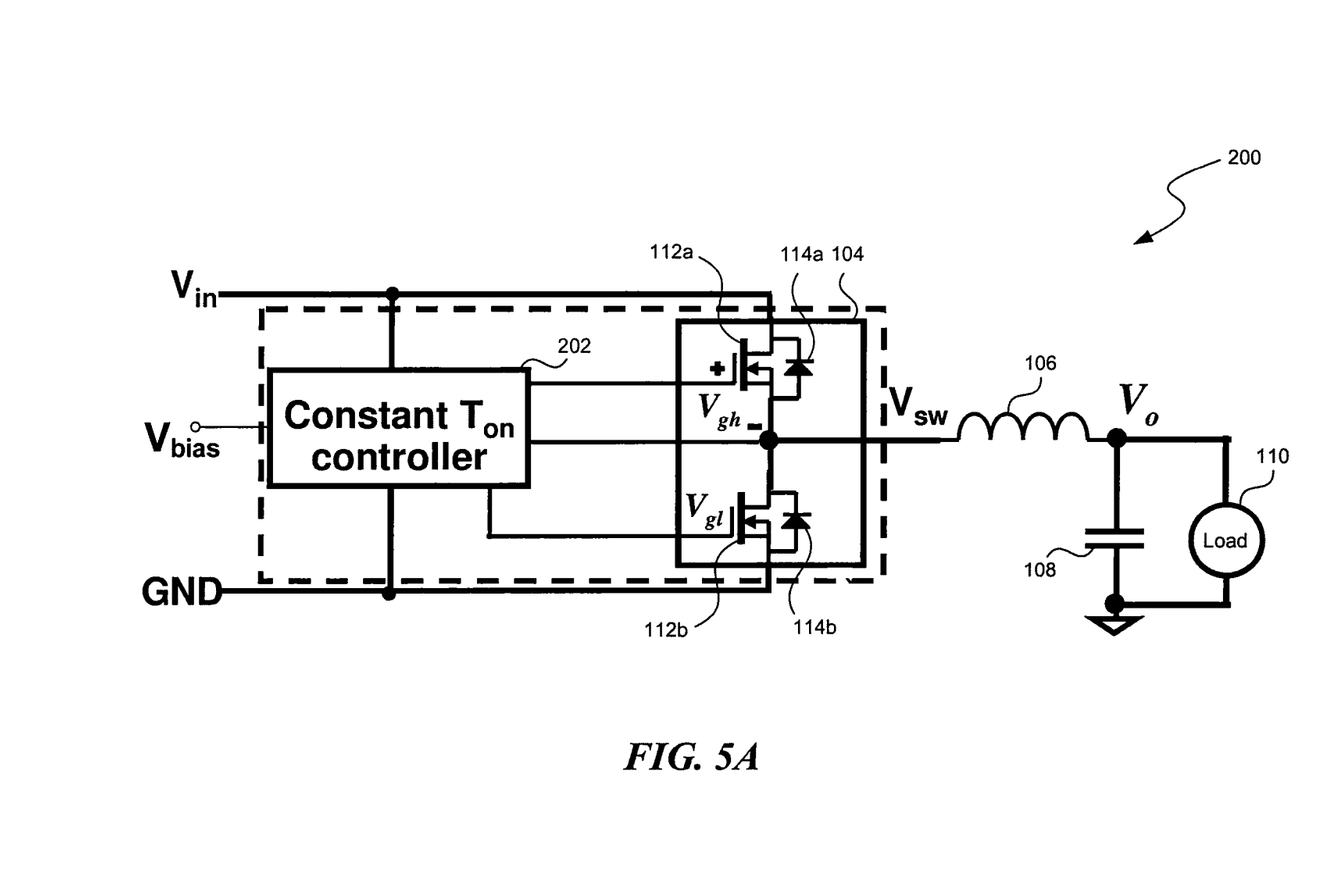
FIG. 5A is a schematic circuit diagram of a buck converter in accordance with embodiments of the technology.
Figure 5B:
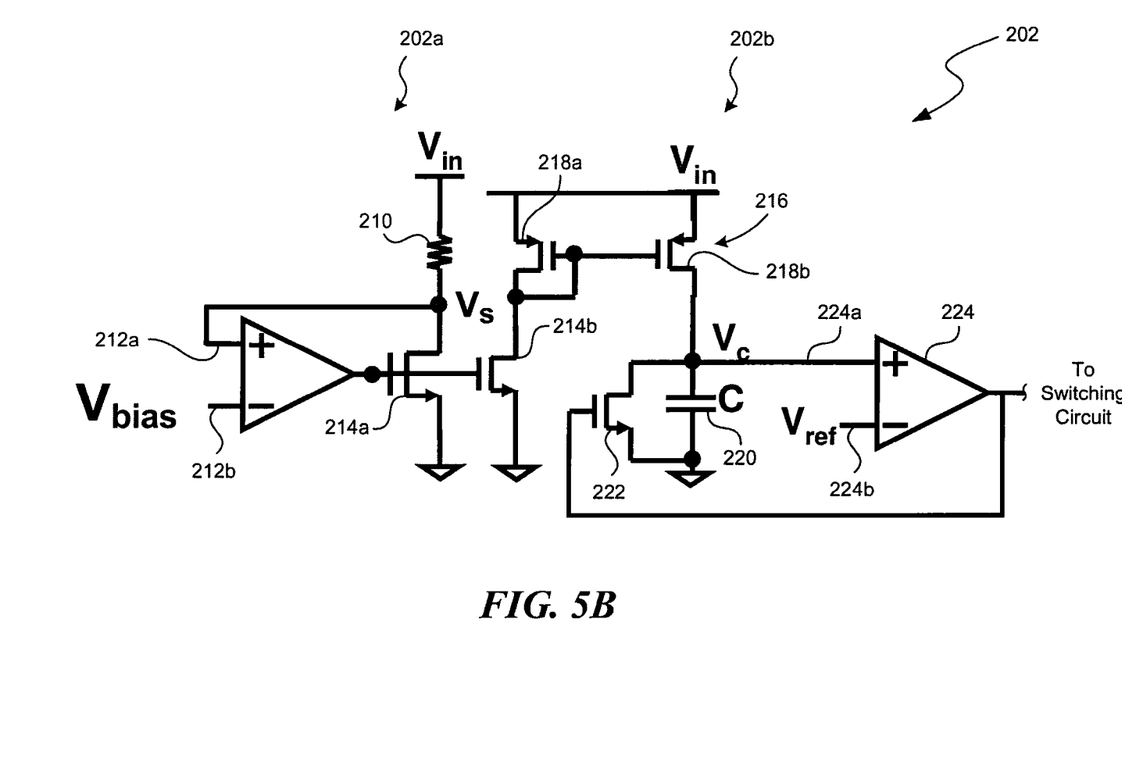
FIG. 5B is a schematic diagram of a constant $T_{on}$ controller useful in the buck converter of FIG. 5A in accordance with embodiments of the present technology.

FIG. 5A is a schematic circuit diagram of a buck converter 200, and FIG. 5B is a schematic diagram of a constant $T_{on}$ controller 202 useful in the buck converter 200 of FIG. 5A in accordance with embodiments of the present technology. As shown in FIG. 5A, the buck converter 200 can include components generally similar to the buck converter 100 in FIG. 1. For example, the buck converter 200 can include a first switching transistor 112a with a first body diode 114a, a second switching transistor 112b with a second body diode 114b, an inductor 106, a capacitor 108 coupled to a load 110. For purposes of clarity, the discussion of these components is omitted. The buck converter 200 also includes a constant $T_{on}$ controller 202 that is configured to accept a DC bias voltage ($V_{bias}$). As discussed in more detail below with reference to FIG. 5B, the DC bias voltage ($V_{bias}$) can be adjusted to at least reduce the output frequency variations due to input voltage ($V_{in}$) variations.

As shown in FIG. 5B, the constant $T_{on}$ controller 202 can include a current setting portion 202a and a switching control portion 202b operatively coupled to each other. Even though only particular components of the constant $T_{on}$ controller 202 are shown in FIG. 5B, in other embodiments, the constant $T_{on}$ controller 202 can also include different and/or additional components.

The current setting portion 202a can be configured to supply a control current (I) based on the input voltage ($V_{in}$) and the DC bias voltage ($V_{bias}$). As shown in FIG. 5B, the current setting portion 202a can include a resistor 210 and a first transistor 214a coupled in series between an input voltage ($V_{in}$) and a reference voltage ($V_{ref}$) (e.g., the ground in FIG. 5B or other suitable reference voltages). The current setting portion 202a can also include a first comparator 212 (e.g., an operational amplifier) having a first terminal 212a coupled to the source of the first transistor 214a and a second terminal 212b coupled to the DC bias voltage ($V_{bias}$). The first comparator 212 has an output terminal coupled to the gate of the first transistor 214a.

In operation, the first transistor 214a is turned on when the voltage at its source ($V_s$) is generally equal to the DC bias voltage ($V_{bias}$). As a result, the current setting portion 202a can set the control current (I) flowing through the resistor 210 and the first transistor 214a as follows:

$$I = \frac{V_{in} - V_{bias}}{R} \qquad \text{Equation 6}$$

where R is the resistance of the resistor 210. The control current (I) is then provided to the switching control portion 202b to generate a switching signal for the switching circuit 104 (FIG. 5A).

The switching control portion 202b is configured to receive the control current (I) from the current setting portion 202a and generate a switching control signal based thereon. As shown in FIG. 5B, the switching control portion 202b includes a second transistor 214b coupled to the output of the comparator 212. In one embodiment, the second transistor 214b is generally matched with the first transistor 214a (i.e., having substantially the same device properties). In other embodiments, the second transistor 214b may have other suitable configurations.

The switching control portion 202b can also include a current mirror 216, a switching capacitor 220, and a discharging transistor 222, and a second comparator 224 operatively coupled together. The current mirror 216 includes a first mirror transistor 218a coupled to the source of the second transistor 214b and a second mirror transistor 218b coupled in series with the switching capacitor 220. The switching capacitor 220 includes a first terminal coupled to the source of the second mirror transistor 218b and a second terminal coupled to a reference voltage ($V_{ref}$) (e.g., the ground in FIG. 5B). The discharging transistor 222 has a source coupled to the first terminal of the switching capacitor 220, a drain coupled to the second terminal of the switching capacitor 220, and a gate coupled to the output terminal of the second comparator 224. The second comparator 224 has a first input terminal 224a coupled to the first terminal of the switching capacitor 220 and a second input terminal 224b coupled to a reference voltage ($V_{ref}$).

In operation, the second transistor 214b sets a current through the first mirror transistor 218a to be generally the same as the control current (I) flowing through the resistor 210 and the first transistor 214a. The current mirror 216 then "copies" the control current (I) and provides it to the first terminal of the switching capacitor 220. The control current (I) than charges the switching capacitor 220 to a charging voltage ($V_c$). The second comparator 224 then compares the charging voltage ($V_c$) to the reference voltage ($V_{ref}$). When the charging voltage ($V_c$) is greater than the reference voltage ($V_{ref}$) after a period of time, the second comparator 224 provides a switching signal to the switching circuit 104 (FIG. 5A) to control the on/off of the first and second switching transistors 112a and 112b (FIG. 5A). The second comparator 224 also provides the switching signal to the gate of the discharging transistor 222. The discharging transistor 222 is then turned on and discharges the switching capacitor 220. As a result, the charging voltage ($V_c$) is now less than the reference voltage ($V_{ref}$), the discharging transistor 222 is turned off, and the foregoing process repeats.

Figure 6:
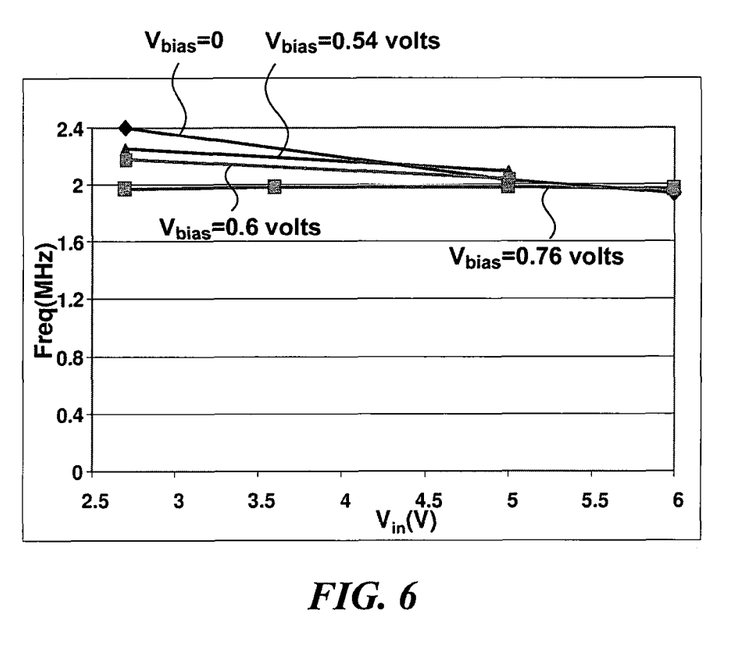
FIG. 6 is a chart of frequency versus input voltage ($V_{in}$) simulation results for a buck converter having a constant $T_{on}$ controller generally similar to that shown in FIG. 5A in accordance with embodiments of the present technology.

The present inventors have discovered that by adjusting the DC bias voltage ($V_{bias}$), the output frequency variations due to input voltage ($V_{in}$) variations can be at least reduced or substantially eliminated. For example, FIG. 6 is a chart of frequency versus input voltage ($V_{in}$) simulation results for a buck converter having a constant $T_{on}$ controller generally similar to that shown in FIG. 5A at different DC bias voltage ($V_{bias}$) levels. As shown in FIG. 6, at DC bias voltage ($V_{bias}$) levels of 0.54 volt, 0.60 volt, and 0.76 volt, the output frequency variations are significantly reduced when compared to not applying the DC bias voltage ($V_{bias}$). In particular, the output frequency variation at a DC bias voltage ($V_{bias}$) of 0.76 volt is less than 1% between input voltages ($V_{in}$) of 5.0 volts and 2.7 volts. As a result, the output frequency variations are substantially eliminated. The simulation results are summarized in the table below.

| DC bias voltage ($V_{bias}$) | $\Delta f_{s\_5v}/f_{s\_2.7v}$ |
|---|---|
| 0 | 17% |
| 0.54 volt | 7% |
| 0.6 volt | 6% |
| 0.76 volt | 1% |

Even though the DC bias voltage ($V_{bias}$) has the particular values as shown in the table above, in certain embodiments, the DC bias voltage ($V_{bias}$) can have other values greater than zero. For example, the DC bias voltage ($V_{bias}$) can be about 0.2 volt to about 5.0 volts, about 0.3 volt to about 3.0 volts, about 0.5 volt to about 2.5 volts, and/or can have other suitable values.

In certain embodiments, adjusting the DC bias voltage ($V_{bias}$) can be based on a desired output frequency variation (e.g., a percentage of variation). For example, a value of the input voltage ($V_{in}$) to the buck converter can be varied (e.g., from 2.7 volts to 5.0 volts). A frequency shift of the output voltage ($V_o$) as a result of the varied value of the input voltage ($V_{in}$) can then be measured. Based on the measured frequency shift of the output voltage ($V_o$) and a target frequency shift (e.g., as a variation percentage), the DC bias voltage ($V_{bias}$) may be adjusted. In one embodiment, the target frequency shift may be reached when the variation percentage is less than about 7%, about 5%, about 3%, about 1%, and/or other suitable percentage values.

In other embodiments, the DC bias voltage ($V_{bias}$) can be adjusted empirically to at least approximately minimize the output frequency variation. For example, the DC bias voltage ($V_{bias}$) can be varied with a preselected step change (e.g., 0.1 volt). The corresponding output frequencies can then be measured and manipulated (e.g., plotted, fitted with linear or polynomial regression, etc.) to determine a minimum value of the output frequency variation and its corresponding value of the DC bias voltage ($V_{bias}$). In further embodiments, the DC bias voltage ($V_{bias}$) can be adjusted based on other suitable criteria.

Figure 7A:
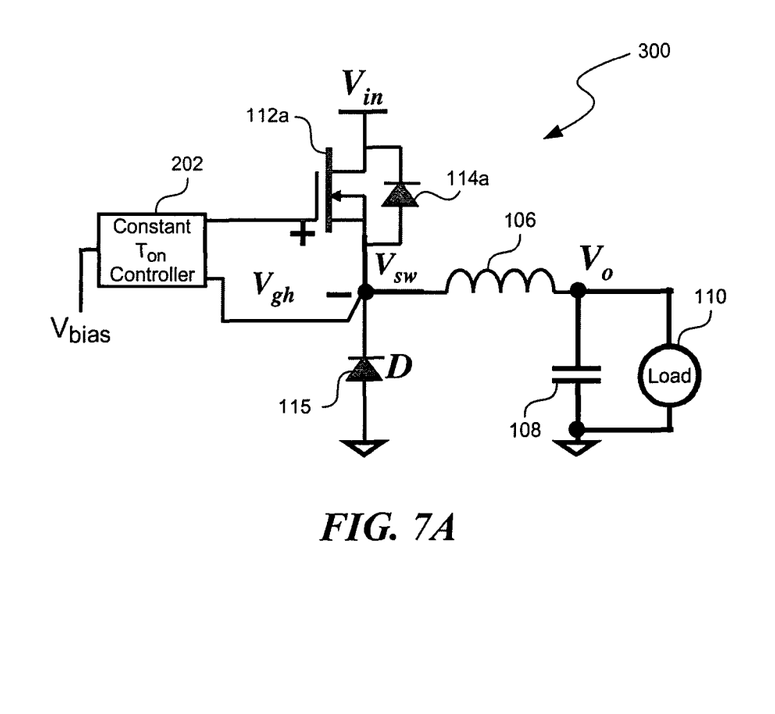
FIG. 7A is a portion of a buck converter.
Figure 7B:
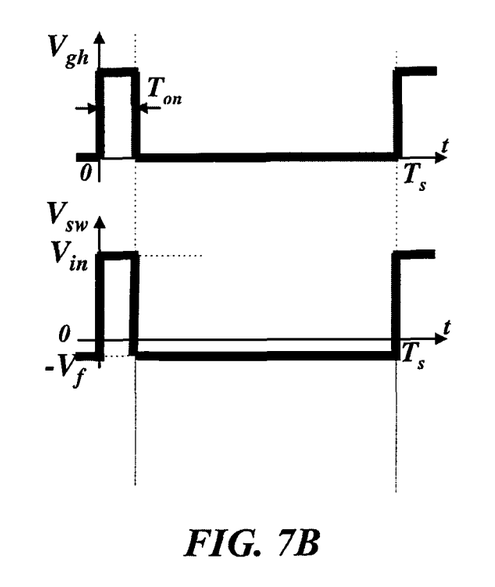
FIG. 7B illustrates voltage versus time charts during operation of the buck converter in FIG. 7A in accordance with embodiments of the present technology.

Even though the constant $T_{on}$ controller 202 is shown in FIG. 5A as applied in the synchronous buck converter 200, in other embodiments, the constant $T_{on}$ controller 202 can also be applied in an asynchronous buck converter. For example, as shown in FIGS. 7A and 7B, instead of having the second switching transistor 112b (FIG. 5A), a buck converter 300 can include a rectifier 115 (e.g., a diode). In further embodiments, the constant $T_{on}$ controller 202 can also be applied in a boost converter, a combination buck/boost converter, and/or other suitable types of switch-mode voltage converters.

From the foregoing, it will be appreciated that specific embodiments of the technology have been described herein for purposes of illustration, but that various modifications may be made without deviating from the disclosed technology. Elements of one embodiment may be combined with other embodiments in addition to or in lieu of the elements of the other embodiments. Accordingly, the technology is not limited except as by the appended claims.

We claim:

1. A switch-mode voltage converter, comprising:
a switching transistor coupled between an input voltage ($V_{in}$) and ground;
a constant $T_{on}$ controller coupled directly between the input voltage ($V_{in}$) and the ground, the constant $T_{on}$ controller being configured to periodically turn on the switching transistor for a generally constant period of time; and
wherein the constant $T_{on}$ controller is further coupled to a DC bias voltage ($V_{bias}$) and configured to generate a control current based on the input voltage ($V_{in}$) and the DC bias voltage ($V_{bias}$) for generating a switching signal for the switching transistor, wherein when the input voltage ($V_{in}$) varies, the DC bias voltage ($V_{bias}$) is adjusted to minimize the output frequency variations due to the input voltage ($V_{in}$) variations.

2. The switch-mode voltage converter of claim 1 wherein:
the switching transistor is a first switching transistor;
the switch-mode voltage converter also includes a second switching transistor coupled to the first switching transistor;
a source of the first switching transistor is coupled to a drain of the second switching transistor;
a drain of the first switching transistor is coupled to the input voltage ($V_{in}$);
a source of the second switching transistor is coupled to the ground;
the controller is coupled to a gate of both the first and second switching transistors;
the switch-mode voltage converter further includes an inductor and a capacitor coupled to the source of the first switching transistor in series;
the controller is configured to periodically turn on the first switching transistor to charge the inductor and the capacitor for the generally constant period of time;
the controller includes:
a resistor coupled to the input voltage ($V_{in}$);
a comparator having a first input terminal coupled to the resistor and a second input terminal coupled to the DC bias voltage ($V_{bias}$);
a transistor having a source coupled to the resistor, a drain coupled to the ground, and a gate coupled to an output terminal of the comparator; and
the control current is a current flowing through the resistor and the transistor and is set as follows:

$$I = \frac{V_{in} - V_{bias}}{R}$$

where I is the control current, R is a resistance of the resistor, and wherein the DC bias voltage ($V_{bias}$) is about 0.5 volts to about 2.5 volts.

3. The switch-mode voltage converter of claim 1 wherein:
the switching transistor is a first switching transistor;
the switch-mode voltage converter also includes a second switching transistor coupled to the first switching transistor;
a source of the first switching transistor is coupled to a drain of the second switching transistor;
a drain of the first switching transistor is coupled to the input voltage ($V_{in}$);
a source of the second switching transistor is coupled to the ground;
the controller is coupled to a gate of both the first and second switching transistors;
the switch-mode voltage converter further includes an inductor and a capacitor coupled to the source of the first switching transistor in series; and
the controller includes:
a resistor coupled to the input voltage ($V_{in}$);
a comparator having a first input terminal coupled to the resistor and a second input terminal coupled to the DC bias voltage ($V_{bias}$); and
a transistor having a source coupled to the resistor, a drain coupled to the ground, and a gate coupled to an output terminal of the comparator.

4. The switch-mode voltage converter of claim 1 wherein:
the switch-mode voltage converter also includes a diode coupled to the switching transistor, the diode having a cathode and an anode;
a source of the switching transistor is coupled to the cathode of the diode;
a drain of the switching transistor is coupled to the input voltage ($V_{in}$);
the anode of the diode is coupled to the ground;
the controller is coupled to a gate of the switching transistor;
the switch-mode voltage converter further includes an inductor and a capacitor coupled to the source of the first switching transistor in series; and
the controller includes:
a resistor coupled to the input voltage ($V_{in}$);
a comparator having a first input terminal coupled to the resistor and a second input terminal coupled to the DC bias voltage ($V_{bias}$); and
a transistor having a source coupled to the resistor, a drain coupled to the ground, and a gate coupled to an output terminal of the comparator.

5. The switch-mode voltage converter of claim 1 wherein the controller includes:
a resistor coupled to the input voltage ($V_{in}$);
a comparator having a first input terminal coupled to the resistor and a second input terminal coupled to the DC bias voltage ($V_{bias}$); and
a transistor having a source coupled to the resistor, a drain coupled to the ground, and a gate coupled to an output terminal of the comparator.

6. The switch-mode voltage converter of claim 1 wherein the controller includes:
a resistor coupled to the input voltage ($V_{in}$); and
a comparator having a first input terminal coupled to the resistor and a second input terminal coupled to the DC bias voltage ($V_{bias}$).

7. The switch-mode voltage converter of claim 1 wherein the controller includes:
a resistor coupled to the input voltage ($V_{in}$); and
a comparator having a first input terminal coupled to the resistor and a second input terminal coupled to the DC bias voltage ($V_{bias}$), wherein the DC bias voltage ($V_{bias}$) is about 0.2 volt to about 5.0 volts.

8. The switch-mode voltage converter of claim 1 wherein the controller includes:
a resistor coupled to the input voltage ($V_{in}$), the resistor having a resistance R;
a comparator having a first input terminal coupled to the resistor and a second input terminal coupled to the DC bias voltage ($V_{bias}$); and
a transistor having a source coupled to the resistor, a drain coupled to the ground, and a gate coupled to an output terminal of the comparator; and
the control current is a current flowing through the resistor and the transistor and is set as follows:

$$I = \frac{V_{in} - V_{bias}}{R}$$

where I is the control current.

9. The switch-mode voltage converter of claim 1 wherein the controller includes:
a resistor coupled to the input voltage ($V_{in}$), the resistor having a resistance R;
a comparator having a first input terminal coupled to the resistor and a second input terminal coupled to the DC bias voltage ($V_{bias}$), wherein the DC bias voltage ($V_{bias}$) is about 0.2 volt to about 5.0 volts; and
a transistor having a source coupled to the resistor, a drain coupled to the ground, and a gate coupled to an output terminal of the comparator; and
the control current is a current flowing through the resistor and the transistor and is set as follows:

$$I = \frac{V_{in} - V_{bias}}{R}$$

where I is the control current.

10. A method of controlling a frequency variation in an output voltage ($V_o$) of a switch-mode voltage converter having a switching transistor and a constant $T_{on}$ controller coupled directly between the input voltage ($V_{in}$) and the ground, the constant $T_{on}$ controller being configured to periodically turn on the switching transistor for a generally constant period of time, comprising:
applying a DC bias voltage ($V_{bias}$) to the constant $T_{on}$ controller;
varying a value of the input voltage ($V_{in}$) to the switch-mode voltage converter;
measuring a frequency shift of the output voltage ($V_o$) as a result of the varied value of the input voltage ($V_{in}$); and
adjusting the DC bias voltage ($V_{bias}$) based on a target value for the frequency shift.

11. The method of claim 10, further comprising:
calculating a variation percentage based on the measured frequency shift; and wherein adjusting the DC bias voltage ($V_{bias}$) includes, if the calculated variation percentage is less than 5%, indicating that the DC bias voltage ($V_{bias}$) is set.

12. The method of claim 10, further comprising:

calculating a variation percentage based on the measured frequency shift; and wherein adjusting the DC bias voltage ($V_{bias}$) includes, if the calculated variation percentage is less than 1%, indicating that the DC bias voltage ($V_{bias}$) is set.

13. The method of claim 10 wherein:

varying the value of the input voltage ($V_{in}$) includes applying DC bias voltage ($V_{bias}$) to the constant $T_{on}$ controller, the DC bias voltage ($V_{bias}$) having a plurality of values;

measuring the frequency shift includes measuring a plurality of frequency shifts corresponding to the plurality of values of the DC bias voltage ($V_{bias}$); and the method further includes manipulating the plurality of frequency shifts and the corresponding values of the DC bias voltage ($V_{bias}$) to determine a minimum value for the frequency shift and a corresponding value of the DC bias voltage ($V_{bias}$).

14. The method of claim 10 wherein:

varying the value of the input voltage ($V_{in}$) includes applying DC bias voltage ($V_{bias}$) to the constant $T_{on}$ controller, the DC bias voltage ($V_{bias}$) having a plurality of values;

measuring the frequency shift includes measuring a plurality of frequency shifts corresponding to the plurality of values of the DC bias voltage ($V_{bias}$);

the method further includes manipulating the plurality of frequency shifts and the corresponding values of the DC bias voltage ($V_{bias}$) to determine a minimum value for the frequency shift; and adjusting the DC bias voltage ($V_{bias}$) includes setting the DC bias voltage ($V_{bias}$) to have a value corresponding to the determined minimum value for the frequency shift.

15. The method of claim 10 wherein:

varying the value of the input voltage ($V_{in}$) includes applying DC bias voltage ($V_{bias}$) to the constant $T_{on}$ controller, the DC bias voltage ($V_{bias}$) having a plurality of values;

measuring the frequency shift includes measuring a plurality of frequency shifts corresponding to the plurality of values of the DC bias voltage ($V_{bias}$);

the method further includes plotting and/or performing linear or polynomial regression on the plurality of frequency shifts and the corresponding values of the DC bias voltage ($V_{bias}$) to determine a minimum value for the frequency shift; and adjusting the DC bias voltage ($V_{bias}$) includes setting the DC bias voltage ($V_{bias}$) to have a value corresponding to the determined minimum value for the frequency shift.

* * * * *